US009838474B2

(12) United States Patent
Gates et al.

(10) Patent No.: US 9,838,474 B2
(45) Date of Patent: Dec. 5, 2017

(54) DISTRIBUTING AND SYNCHRONIZING OBJECTS

(71) Applicant: Apple Inc., Cupertino, CA (US)

(72) Inventors: Patrick Gates, San Francisco, CA (US); Craig Federighi, Los Altos, CA (US); Eric Noyau, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/987,651

(22) Filed: Jan. 4, 2016

(65) Prior Publication Data

US 2016/0261691 A1    Sep. 8, 2016

Related U.S. Application Data

(63) Continuation of application No. 14/465,651, filed on Aug. 21, 2014, now Pat. No. 9,247,000, which is a
(Continued)

(51) Int. Cl.
*G06F 9/44* (2006.01)
*H04L 29/08* (2006.01)
(Continued)

(52) U.S. Cl.
CPC .... *H04L 67/1095* (2013.01); *G06F 17/30174* (2013.01); *G06F 17/30194* (2013.01);
(Continued)

(58) Field of Classification Search
CPC ........... H04L 67/1096; H04L 29/12141; H04L 43/16; G06F 8/65; G06F 8/67; G06F 8/68;
(Continued)

(56) References Cited

U.S. PATENT DOCUMENTS 4,714,992 A    12/1987  Gladney et al.
5,592,672 A *   1/1997  Grewal ............... H04Q 3/0025
                                                709/238
(Continued)

FOREIGN PATENT DOCUMENTS

WO    WO 0033217    6/2000

OTHER PUBLICATIONS

Ezeife C. I. "Class Fragmentation in a Distributed Object Based System", Ph. D. Thesis, University of Manitoba, Department of Computer Science, 1995.
(Continued)

*Primary Examiner* — Anna Deng
(74) *Attorney, Agent, or Firm* — DLA Piper LLP US

(57) ABSTRACT

The described embodiments distribute and synchronize objects in a network. More specifically, the described embodiments distribute copies of objects locally (i.e., store copies of objects in local address spaces). By storing a copy of a given object in a local address space, the object's methods may be executed locally, which can help to avoid excessive network traffic associated with remotely executing the object's methods. However, executing an object's methods locally can result in the state of the object (i.e., data associated with the object, etc.) becoming out of sync with other copies of the object in the network. To avoid issues associated with unsynchronized copies of the object in the network, the described embodiments use a policy that specifies conditions under which objects are to be synchronized.

20 Claims, 6 Drawing Sheets

Related U.S. Application Data continuation of application No. 13/556,447, filed on Jul. 24, 2012, now Pat. No. 8,875,117, which is a continuation of application No. 13/077,885, filed on Mar. 31, 2011, now Pat. No. 8,255,895, which is a continuation of application No. 12/539,129, filed on Aug. 11, 2009, now Pat. No. 7,941,796, which is a continuation of application No. 11/157,306, filed on Jun. 20, 2005, now Pat. No. 7,584,468, which is a continuation of application No. 10/150,494, filed on May 16, 2002, now Pat. No. 6,910,052, which is a continuation of application No. 09/309,246, filed on May 10, 1999, now Pat. No. 6,430,576.

(51) Int. Cl.
| | | |
|---|---|---|
| G06F 17/30 | (2006.01) | |
| H04L 29/12 | (2006.01) | |
| H04L 12/26 | (2006.01) | |
| G06F 9/445 | (2006.01) | |

(52) U.S. Cl.
CPC .. *G06F 17/30575* (2013.01); *H04L 29/12141* (2013.01); *H04L 43/16* (2013.01); *H04L 61/1558* (2013.01); *G06F 8/65* (2013.01); *G06F 8/67* (2013.01); *G06F 8/68* (2013.01); *Y10S 707/99932* (2013.01); *Y10S 707/99934* (2013.01); *Y10S 707/99952* (2013.01)

(58) Field of Classification Search
CPC ......... G06F 17/30174; G06F 17/30194; G06F 17/30575
USPC ....................................................... 717/168
See application file for complete search history.

(56) References Cited

U.S. PATENT DOCUMENTS

| | | |
|---|---|---|
| 5,600,834 A | 2/1997 | Howard |
| 5,787,247 A | 7/1998 | Norin et al. |
| 5,872,973 A | 2/1999 | Mitchell et al. |
| 5,873,096 A | 2/1999 | Lim et al. |
| 5,924,116 A | 7/1999 | Aggarwal et al. |
| 5,956,728 A | 9/1999 | Federighi et al. |
| 5,964,828 A | 10/1999 | Cummings |
| 6,006,280 A | 12/1999 | Mornngstar et al. |
| 6,044,205 A | 3/2000 | Reed et al. |
| 6,052,718 A | 4/2000 | Gifford |
| 6,058,401 A | 5/2000 | Stamos et al. |
| 6,085,197 A | 7/2000 | Federighi et al. |
| 6,098,078 A | 8/2000 | Gehani et al. |
| 6,125,369 A * | 9/2000 | Wu .................. G06F 17/30578 707/613 |
| 6,145,013 A | 11/2000 | Morningstar et al. |
| 6,167,427 A | 12/2000 | Rabinovich et al. |
| 6,189,011 B1 | 2/2001 | Lim et al. |
| 6,192,368 B1 | 2/2001 | Gerard et al. |
| 6,212,557 B1 | 4/2001 | Oran |
| 6,256,675 B1 | 7/2001 | Rabinovich |
| 6,324,693 B1 | 11/2001 | Brodersen et al. |
| 6,367,077 B1 | 4/2002 | Brodersen et al. |
| 6,370,436 B1 | 4/2002 | Howard et al. |
| 6,430,576 B1 | 8/2002 | Gates et al. |
| 6,438,590 B1 | 8/2002 | Gartner et al. |
| 6,446,092 B1 | 9/2002 | Sutter |
| 6,449,764 B1 | 9/2002 | Sliger et al. |
| 6,457,065 B1 | 9/2002 | Rich et al. |
| 6,463,454 B1 | 10/2002 | Lumelsky et al. |
| 6,466,980 B1 | 10/2002 | Lumelsky et al. |
| 6,640,335 B2 | 10/2003 | Ebisawa |
| 6,671,688 B1 | 12/2003 | Nikols et al. |
| 7,127,701 B2 | 10/2006 | Fables et al. |
| 2002/0065879 A1 | 5/2002 | Ambrose et al. |
| 2002/0065926 A1 | 5/2002 | Hackney et al. |
| 2002/0174142 A1 | 11/2002 | Demers et al. |
| 2003/0009753 A1 | 1/2003 | Brodersen et al. |
| 2003/0110241 A1 | 6/2003 | Cheng et al. |
| 2004/0210641 A1 | 10/2004 | Wu |
| 2007/0055967 A1 | 3/2007 | Poff et al. |

OTHER PUBLICATIONS

Ezeife, C.I. and Baker, K. "A Comprehensive Approach to Horizontal Class Fragmentation in a Distributed Object Based System" International Journal of Distributed and Parallel Databases vol. 3 No. 3 pp. 247-272, 1995.

Ezeife, C.I. and Baker, K. "Distributed Object Based Design: Vertical Fragmentation of Classes" International Journal of Distributed and Parallel Databases vol. 6, No. 4 pp. 317-350, Mar. 30, 1998.

Fung, C., K. Karlapalem and Q. Li "An Analytical Approach Towards, Evaluating Method-Induced Vertical Partitioning Algorithms," Technical Report HKUST-CS96-33, Department of Computer Science, University of Science and Technology, Hong Kong, Aug. 1996.

Gwertzman, J. and M. Seltzer "World Wide Web Cache Consistency", Proceedings of the USENIX 1996 Annual Technical Conference, Jan. 1996.

Kamalakar, K. and Qing, L. "Method-Induced Partitioning Schemes for Object-Oriented Database" Proceedings of the 16th ICDCS International Conference on Distributed Computing Systems pp. 377-384, May 27-30, 1996.

Krishnamurthy, B. and C.E. Wills "Piggyback Cache Validation for Proxy Caches in World Wide Web", Proceeding of the USENIX Symposium and Internet Technologies an Systems, pp. 1-12, Dec. 8-11, 1997.

Krishnamurthy, B. and C.E. Wills "Proxy Cache Coherency and Replacement-Towards More Complete Picture" Proceedings of the 19th IEEE International Conference on Distributed Computing Systems, Austin, TX, Jun. 1999.

Ladin, R. et al. "Providing High Availability Using Lazy Replication", ACM Transactions on Computer Systems, vol. 10, No. 4. Nov. 1992, pp. 360-391.

Makpangou, M., Y. Gourhant, J-P LE Narzul and M. Shapiro "Fragmented Objects for Distributed Abstractions", IEEE Software Journal, Oct. 1, 1991.

Navathe, S., C. Stefano, G. Wiederhold and J. Dou "Vertical Partitioning Algorithms for Database Design", ACM Transactions of Database Systems, vol. 9, No. 4, pp. 680-710, Dec. 1984.

Navathe, S.B. and M. RA "Vertical Partitioning for Database Design: A Graphic Algorithm", Proceeding of the 1989 ACM SIGMOD Conference on Management of Data, pp. 440-450, Jun. 1989.

Oguchi, M. and Ono, K. "A Study of Caching Proxy Mechanisms Realized on Wide Area Distributed Networks" Proceedings of the 5th IEEE Conference on High Performance Distributed Computing (HPDC-5) Aug. 6-9, 1996, pp. 443-449.

Wolfson, O., S. Jajodia and X. Huang "An Adaptive Data Replication Algorithm", ACM Transactions on Database Systems, vol. 22, No. 2, pp. 255-314, Jun. 1997.

Bennett, J.K., J.B. Carter and W. Zwaenepoel "Munin: Distributed Shared Memory Based Type-Specific Memory Coherence", Proceedings of the 2nd ACM SIGPLAN Symposium on Principles and practice of Parallel Programming, pp. 168-176, Feb. 1990.

Cao, P. and Irani,S. "Cost-Aware WWW Proxy Caching Algorithms" Proceedings of the USENIX Symposium on Internet Technologies and Systems Monterey, California, Dec. 8-11, 1997.

Cate, V. "Alex—A Global Filesystem", Proceedings of the 1992 USENIX Conference File System Workshop, pp. 1-12, May 1992.

Chakravarthy, S., J. Muthuraj, R. Varadarajan and S.B. Navathe "An Object Function for Vertically Partitioning Relations in Distributing Database and its Analysis", Technical Report UF-CIS-TR-92-045, University of Florida, pp. 1-25, 1992.

(56) References Cited

OTHER PUBLICATIONS

Chin, R. S. and S. T. Chanson "Distributed Object-Based Programming Systems", ACM Computing Surveys, vol. 23. No. 1, pp. 91-124, Mar. 1991.
Danzig, P.B., Hall, R.S. and Schwartz, M.F. "A Case for File Objects Inside Internetworks", Proceedings of 1993 SIGCOM Conference on Communications Architectures, Protocols and Applications, Oct. 1993, pp. 239-248.

* cited by examiner

DISTRIBUTING AND SYNCHRONIZING OBJECTS

RELATED APPLICATIONS

The instant application is a continuation of, and hereby claims priority to, pending U.S. patent application Ser. No. 14/465,651, by the same inventors, which is titled "Distributing and Synchronizing Objects," which was filed on 21 Aug. 2014, which is a continuation of U.S. patent application Ser. No. 13/556,447, by the same inventors, which is titled "Distributing and Synchronizing Objects," which was filed on 24 Jul. 2012, which is a continuation of U.S. patent application Ser. No. 13/077,885, which was filed on 31 Mar. 2011, which issued as U.S. Pat. No. 8,255,895 on 28 Aug. 2014, which is a continuation of U.S. patent application Ser. No. 12/539,129, which was filed on 11 Aug. 2009, which issued as U.S. Pat. No. 7,941,796 on 10 May 2011, which is a continuation of U.S. patent application Ser. No. 11/157,306, which was filed on 20 Jun. 2005, which issued as U.S. Pat. No. 7,584,468 on 1 Sep. 2009, which is a continuation of U.S. patent application Ser. No. 10/150,494, which was filed on 16 May 2002, which issued as U.S. Pat. No. 6,910,052 on 21 Jun. 2005, and which is a continuation of U.S. patent application Ser. No. 09/309,246, which was filed on 10 May 1999, which issued as U.S. Pat. No. 6,430,576 on 6 Aug. 2002. Each of the above-described applications is incorporated by reference herein.

BACKGROUND OF THE INVENTION

1. Field of the Invention

This invention relates to the field of computer networks, and, more specifically, to a method and apparatus for distributing and synchronizing objects across a network.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Apple, Macintosh, AppleTalk, AppleScript, and all Apple-based trademarks and logos are trademarks or registered trademarks of Apple Computer, Inc. in the United States and other countries.

2. Background Art

In a computer, applications, information, and processes may be controlled and executed by objects. Such objects may contain information (referred to as data) and may contain methods and applications (referred to as behavior) that can manipulate the data. In a computer network environment, multiple computers are linked together and one computer on a network may contain the object (and its associated data and behavior) that another computer desires to access or utilize. To provide the ability for multiple computers on a network to access and utilize an object located on a particular remote computer, a local computer may be provided with a "proxy object" that sends messages to and receives messages from the desired object (referred to as a remote object); however, when numerous computers are linked together (each with their own proxy object), the number of messages generated and transmitted across the network create excessive network traffic such that many applications cannot execute properly. These problems can be better understood by reviewing object oriented programming and networks and how they work.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the behavior/operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

An object is a generic term that is used in the object-oriented programming environment to refer to a module that contains related code and variables. A software application can be written using an object-oriented programming language whereby the program's functionality is implemented using objects.

Software applications can take advantage of a distributed computing capability referred to as distributed objects. Using distributed objects, a first object (a client object), can send a message to a second object (a server object or remote object) regardless of the physical location of either object. That is, the client and server objects can reside on different machines.

The distributed object technology uses a name server, and a local proxy to allow a client-object to communicate with a server object. A name server is used to register the server object. A client accesses the name server to look up the name of the server object. Using the name information, the client object directs a message to the server object.

Instead of going directly from the client to the server, the message is actually received by a proxy object that resides on the same machine as the client object. The proxy object uses specialized methods to repackage a method invocation request and sends it to the remote object. Thus, the proxy object forwards the message to the server object on the server object's machine. A response generated by the server object is forwarded to the client object via the proxy object. The client object need not know the location of the server object. As far as the client object is concerned, the proxy object is the server object. However, the proxy object is only a vehicle for forwarding the message to the server object via the network. The details of the network communication is therefore hidden from the client object.

Using distributed objects, every message sent to the proxy has to cross a network, thereby increasing network traffic. Due to the increase in network traffic, developers are forced to design applications taking the increased traffic into account. For example, a developer may desire some objects to be stored locally because increased network traffic would significantly impact the execution speed of an application if the object were stored remotely with messages transmitted through a proxy object. In some situations, an application may not work at all if an object is stored remotely (e.g., thousands of messages transmitted across a network may cause an application to execute too slowly or cause errors to occur if the application is time sensitive). It is desirable for programmers and developers to implement an application without considering the impact of network traffic or the affect a distributed object environment will have on the application.

Networks

In modern computing environments, it is commonplace to employ multiple computers or workstations linked together in a network to communicate between, and share data with, network users. A network also may include resources, such as printers, modems, file servers, etc., and may also include services, such as electronic mail (email). A network may include multiple computers, resources, and services or may consist of one computer/user.

A network can be a small system (a local area network or "LAN"), or several separate networks can be connected together to form a larger network (a wide area network or "WAN"). Other types of networks include the internet, tel-com networks, the World Wide Web, intranets, extranets, wireless networks, and other networks over which electronic, digital, and/or analog data may be communicated.

The Internet is a worldwide network of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, read information from, download a file from or send an electronic mail message to another computer/client using the Internet. Thus, the internet consists of multiple networks connected to each other into one large network. Networks commonly utilize a server that provides information such as email or web pages to a requesting user (referred to as a client) that is requesting the information. A server may be a designated computer or may exist on an end user's computer. Additionally, a server may be viewed as any computer or processor on a network that provides and processes information. Further, multiple servers may coexist on the same network.

An addressing scheme is employed to identify Internet resources and 25 networks from each other. This addressing scheme is called Uniform Resource Locator (URL). A URL may contain the application protocol to use when accessing the server (e.g., HTTP (hypertext transfer protocol)), the Internet domain name (also referred to as the server host name) of the site on which the server is running, and the location of the resource in the file structure of the server. For example, the URL "http://www.apple.com/index.html" specifies the application protocol ("http"), the server host name ("www.apple.com"), and the filename to be retrieved ("index.html"). The host name may be utilized to uniquely identify a network on the internet. For example, the host name "www.apple.com" identifies an Apple network.

SUMMARY OF THE INVENTION

A method and apparatus for distributing and synchronizing objects. Using traditional distributed objects, a proxy object is utilized to transmit messages and information to a remote object across a network. When applications are resource intensive or when numerous proxy objects are utilized, traditional proxy objects create and utilize excessive network traffic.

One or more embodiments of the invention provide for distributing copies of the objects locally. By copying objects (including the data and behavior for the object) into local address space, the object's methods may be executed locally thereby avoiding excessive network traffic.

The state of the various object copies across a network may not be synchronized due to local changes and modifications. To synchronize the objects, one or more embodiments of the invention provide for the use of a policy that specifies conditions as to when objects are synchronized. Embodiments of the invention provide flexibility in setting the policy to accommodate varying applications. For example, a policy may provide for synchronization that is based temporally (e.g., every 10 minutes or daily at 10:00 P.M.). Alternatively, a policy may provide for synchronization based on the type or number of messages transmitted. In one or more embodiments, a default policy may be utilized that provides for the synchronization of local objects whenever a client issues a request from the remote server. In such an 25 embodiment, the remote server transmits any updated object information when it responds to the local object request. The updated object information may be utilized to synchronize the objects.

DETAILED DESCRIPTION OF THE INVENTION

The invention is a method and apparatus for distributing and synchronizing objects. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
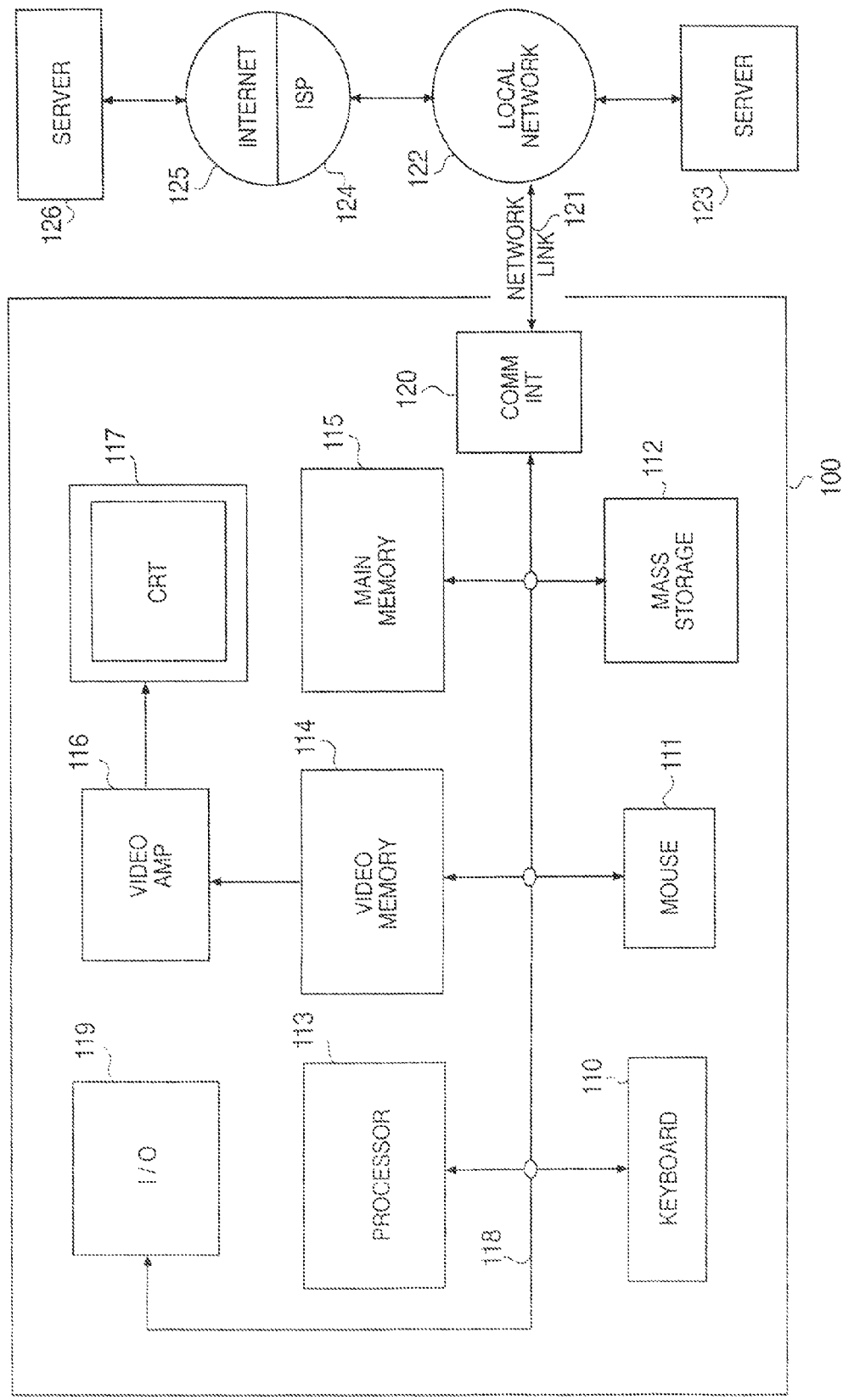
FIG. 1 is a block diagram of one embodiment of a computer system capable of providing a suitable execution environment for one or more embodiments of the invention.

An embodiment of the invention can be implemented as computer software in the form of computer readable code executed on a general purpose computer such as computer 100 illustrated in FIG. 1, or in the form of bytecodes running on a processor (or devices enabled to process bytecodes) existing in a distributed environment (e.g., one or more processors on a network), or in the form of bytecode class files executable within a Java runtime environment running on such a computer. A keyboard 110 and mouse 111 are coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, all coupled to system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 25 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the 25 "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Embodiment of Software Apparatus

Figure 2:
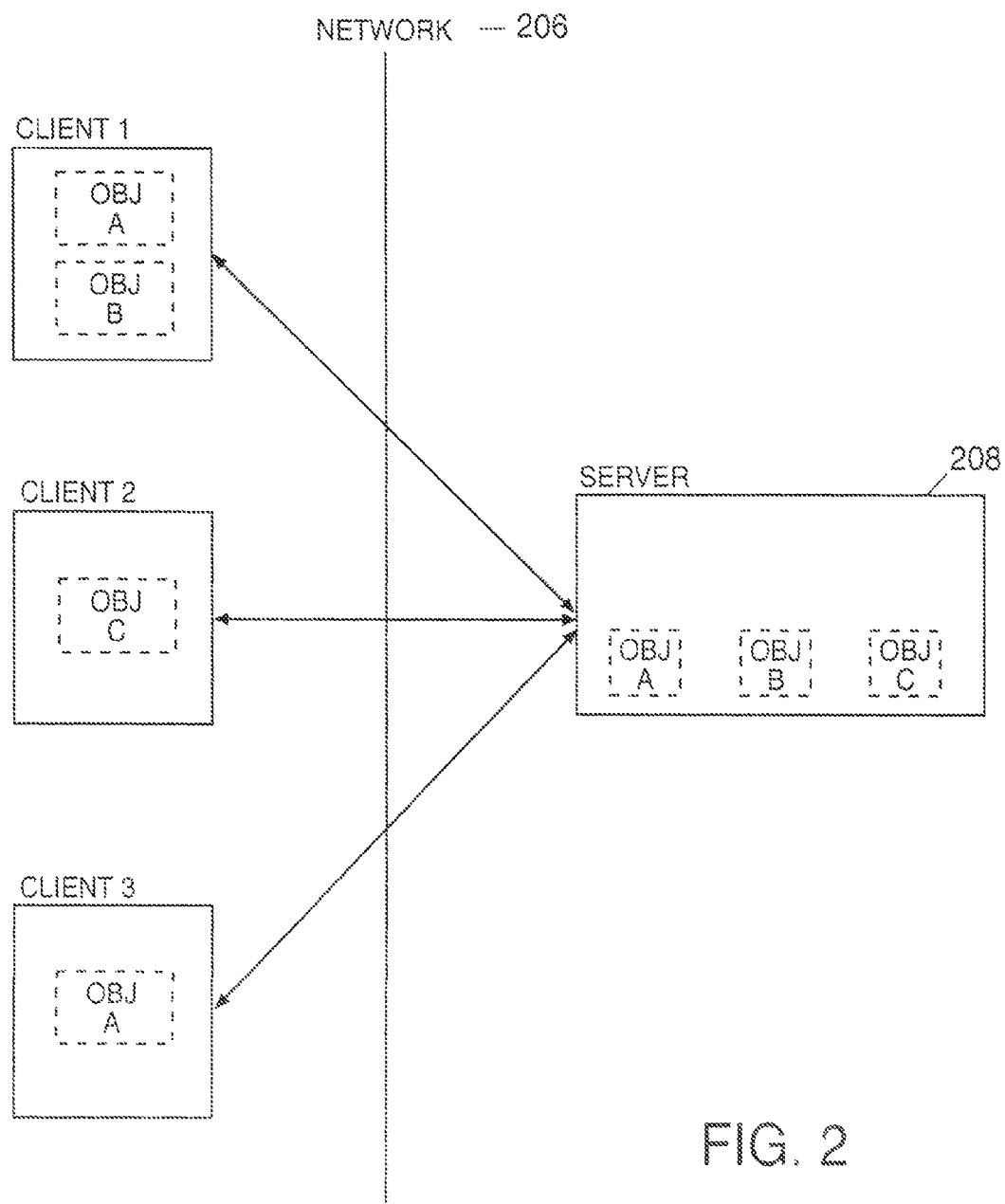
FIG. 2 illustrates the copying and use of objects locally across a network in accordance with one or more embodiments of the invention.

One embodiment of the invention provides for a method and apparatus for distributing and synchronizing objects across a network. In one or more embodiments, an object is copied from the server into local address space (including the code/methods of the object). As a result, when the object receives a message, the object's methods are executed locally. Consequently, there is no implicit network traffic. Further, if a user, desires to send a message to a remote object (using a traditional distributed object approach), such remote messaging is still permitted. FIG. 2 illustrates the copying and use of objects locally across a network. Objects A, B, and C are on server 208. Instead of creating a proxy object on client 1, client 2, or client 3, the objects may be copied across network 206 to one or more clients. Consequently, object A and object B may be copied to client 1. Similarly object C may be copied to client 2 and object A may be copied to client 3.

Using one or more embodiments of the invention, multiple objects across a network are utilized. However, since an object's methods may be executing and an object's data may be modified, the various objects and their associated states may not be synchronized. For example, data on the copy of object A on Client 1 may have been modified by Client 1. Once the data has been modified locally on Client 1, the modified data will not match the data of the copy of object A on Client 3 or Server 208.

One or more embodiments of the invention provide for the synchronization of state between objects across a network. In such an embodiment, the synchronization of objects occurs automatically and transparently to the user. In one or more embodiments, a flexible policy provides for synchronization upon compliance with specified conditions. The policy may provide for one or more conditions that may vary significantly. For example, a policy may be based on the processing of a number of messages (e.g., synchronization may occur when messages have been processed by a local object). Alternatively, a policy may be based on the processing of a certain type of message (e.g., the execution of a particular message or the modification of particular data), for example. Additionally, a policy may be temporally based such that synchronization occurs when a specified time (e.g., 10:00 A.M.) has been reached or occurs every fifteen (15) minutes. In another embodiment, a policy may provide for the occurrence of a user action such as the activation of a "save" button. In one or more embodiments of the invention, the policy may be based on a heuristic, (e.g., requirements obtained due to experimentation and trial and error). A heuristic may be determined dynamically by obtaining and evaluating messages transmitted between a local object and remote object, for example.

After a policy's conditions have been met, one or more embodiments of the invention synchronize the copies of the objects with each other by transmitting the minimum amount of information necessary to reflect the differences to the remote counterpart of the object. The remote counterpart of the object may then propagate the differences to other systems/copies of the object.

Figure 3:
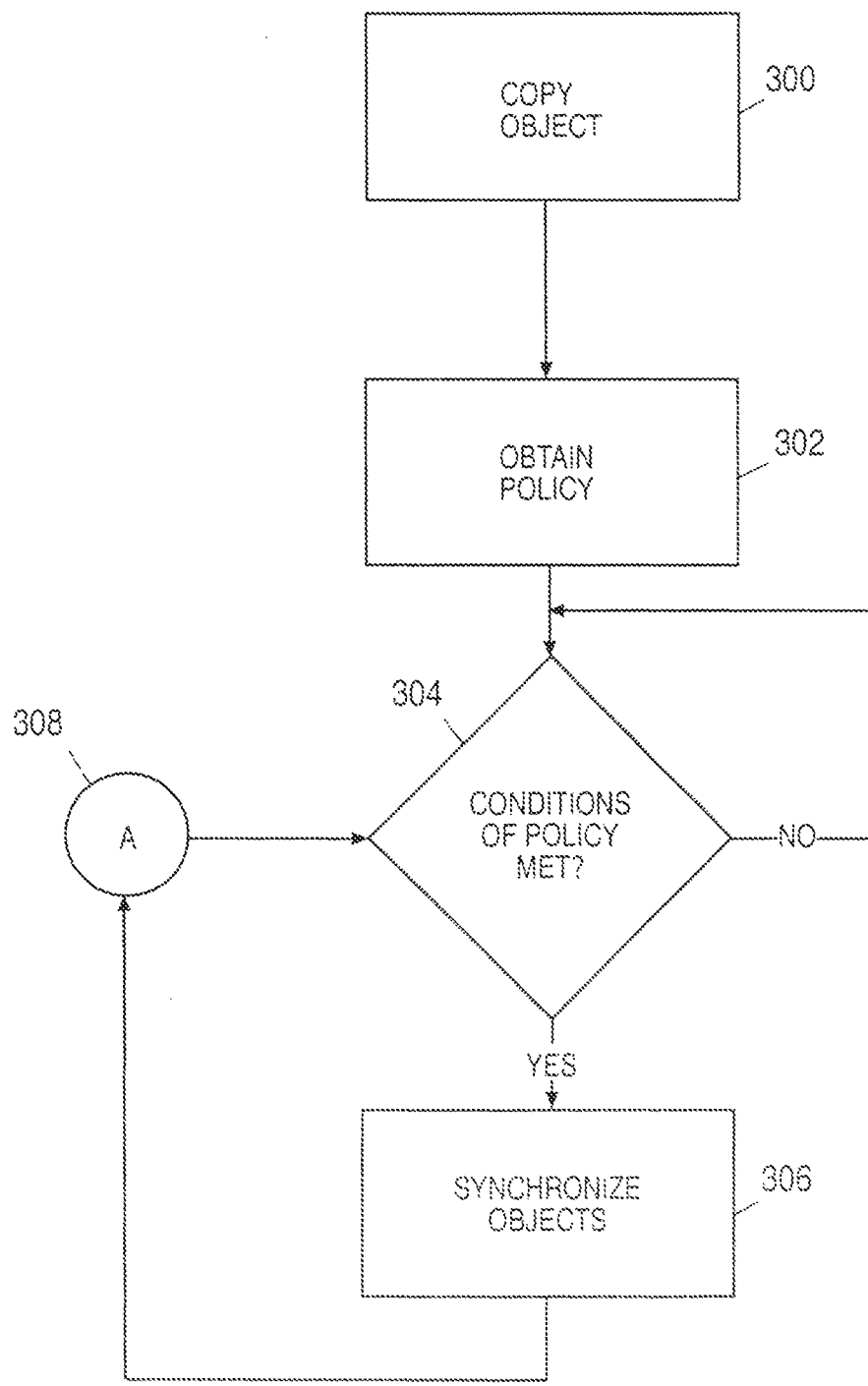
FIG. 3 demonstrates the distribution and synchronization of objects in accordance with one or more embodiments of the invention.

FIG. 3 demonstrates the distribution and synchronization of objects in accordance with one or more embodiments of the invention. Referring to FIG. 2 and FIG. 3, at step 300, an object (e.g., object A, object B, or object C) may be copied from server 208 to a client (e.g., client 1, client 2, or client 3). At step 302, a policy indicating when synchronization is to occur is obtained. A default policy or a policy set by a developer may be utilized, for example. At step 304, a determination is made regarding whether the conditions of the policy have been met (e.g., have the actions that indicate when synchronization should occur been reached). Once the various conditions have been met, the objects are synchronized at step 306. The process continues at step 304 via A 308.

Figure 4:
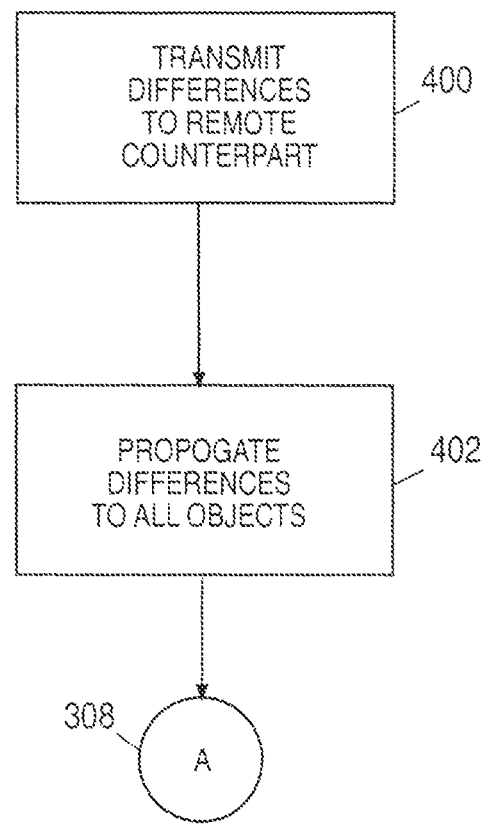
FIG. 4 demonstrates the synchronization of objects in accordance with one or more embodiments of the invention.

FIG. 4 provides additional details regarding the synchronization of objects as provided in step 306. At step 400, a client (e.g., client 1, client 2, or client 3) may transmit any changed information to a remote counterpart (e.g., server 208). At step 402, the changes are propagated to additional copies of the object. For example, if client 1 modifies object A, the changed information of 25 object A is transmitted to server 208. Server 208 may then update the resident object (i.e., object A). At step 402, server 208 transmits the changes to client 3 so that client 3 can update its copy of object A.

At times, the code or business logic of a method may be confidential, sensitive, or secure. Additionally, the execution of a particular method may be resource intensive requiring the use of significant resources (e.g., a database) that may reside remotely. To maintain application security and avoid the network traffic associated with copying numerous resources to a local address space, one or more embodiments of the invention provide for the execution of certain object methods remotely. Before remote execution, any pending changes to local objects may be pushed/transmitted to their remote counterparts so that the remote method is executed in the same environment as if it were executed locally. Once a method is executed remotely, the results, object state, and context may be pushed/transmitted to the local copies of the object. The local copies of the object may then be synchronized with the remote object. Alternatively, the result, object state, and context may only be pushed to the local object that requested the method's execution with synchronization of the remaining objects to occur as set forth in a policy. Such an implementation may provide for multiple copies of an object with restrictions on the local copies that require remote execution of identified methods. Consequently, remote method execution and local method execution may be set as desired. Further, from a programmer's/developer's perspective, all of the methods appear to execute locally.

Objects may contain confidential data that should be accessible only by trusted, secure business logic. To provide this security, one or more embodiments of the invention provide for the mutation of objects as they are copied. For example, in one or more embodiments, a subset of the object data that is confidential is omitted in the response to a user-defined mapping of the object definition (e.g., only non-confidential information is transmitted with the object). Such an implementation may also provide for the creation of a superset of the object data where the resulting copy is populated with data derived from the original object data, or with any permutation of omitted and derived data. Additionally, in order to further reduce complexity from a developer's perspective, some embodiments may provide a mechanism for transmitting an entirely (or partially different) object class during copying, so that the resulting local copy has both different methods and different data than its remote counterpart. Despite the differences in class definitions, one-to-one correspondence may still be maintained between an object and its remote counterparts. Thus, from a developer's perspective, the copies are "the same" despite having different class definitions.

When multiple copies of objects are distributed across a network, one or more of the objects may attempt to modify the same or related data. For example, one object may modify a salary, while another object may modify the percentage of the salary that is for a bonus, while yet another object may modify the bonus amount. However, as this example demonstrates, the modifications made by the various objects conflict with each other (i.e., the bonus amount is being adjusted while the amount that the bonus is based on and the percentage that determines the bonus is altered). One or more embodiments of the invention provide for a policy that sets forth exceptions to modifying the data or behavior of an object and may prioritize certain modifications. Using the above example, a policy may provide that adjustments to bonus percentages and salaries are given higher priority than adjustments to bonus amounts. Consequently, modifications to specified object data may occur before allowing modifications to other related data. If two or more objects modify, data that is unrelated, those changes may be merged together into the object without interference. For example, if one object changes the salary and another changes the last name, the resulting object data will reflect both changes.

In one or more embodiments of the invention, a default synchronization policy provides for always synchronizing all objects whenever a request to save occurs. In one or more embodiments of the invention, whenever a client issues a request (e.g., for a new object, to save an object, or to invoke a remote object method), the response by the server includes updates to other objects (that have occurred on the remote object but have not been updated to the client) that the client has previously accessed. Thus, each time a client issues a request, all local objects are synchronized with their remote counterparts. Since most applications and objects view more data than they change (referred to as "read mostly"), synchronizing the objects according to such a policy alleviates network traffic and ensures the "reading" of accurate data. Synchronization in this manner may be supplemented by specifying conditions when additional synchronization is to occur in the policy.

Figure 5:
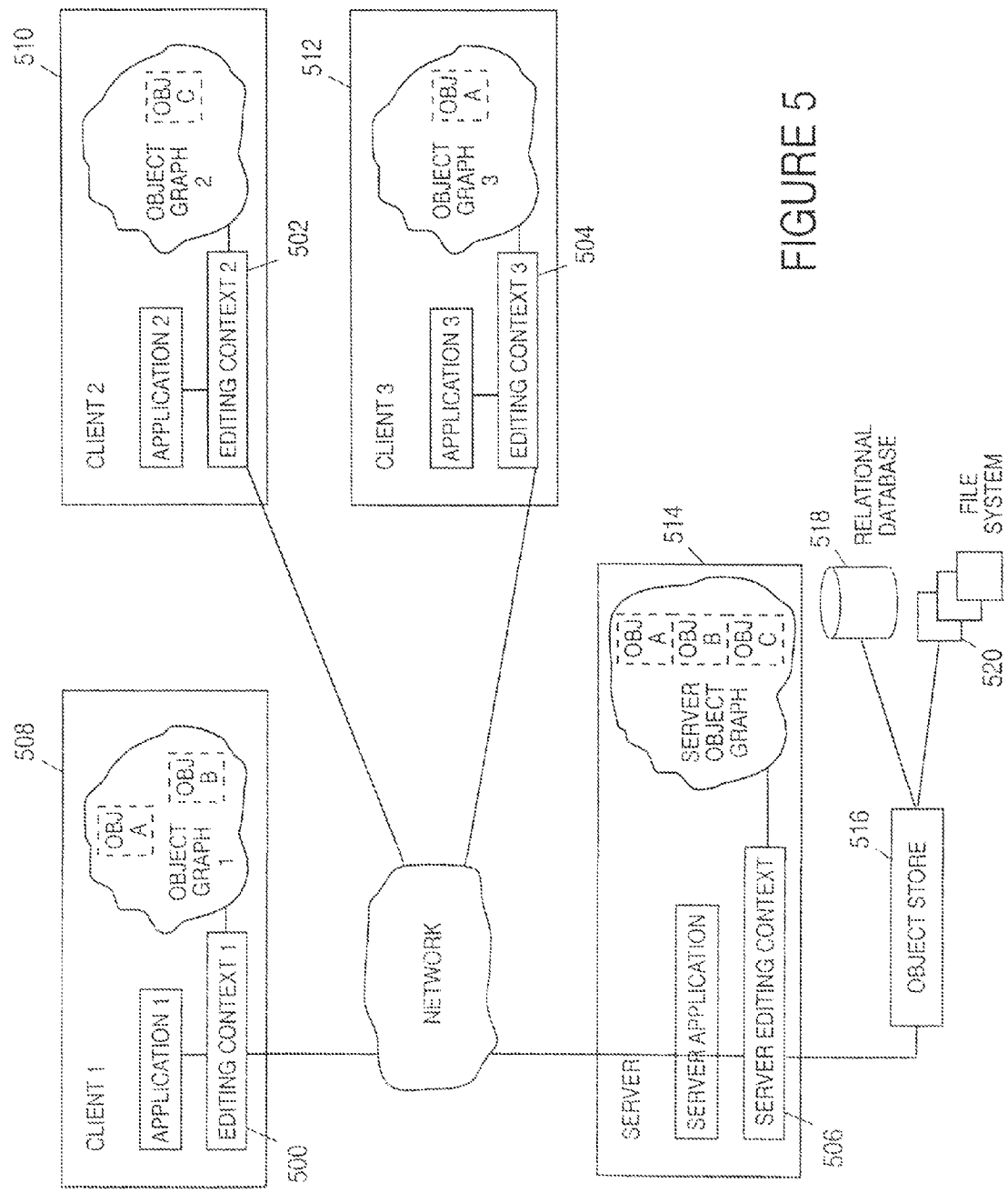
FIG. 5 demonstrates the use of editing contexts to provide for object synchronization in accordance with one or more embodiments of the invention.

FIG. 5 demonstrates the use of editing contexts to provide for object synchronization in accordance with one or more embodiments of the invention. One or more embodiments of the invention use object graph editing contexts 500-506 to manage the synchronization of objects. An object graph (e.g., object graph 1, object graph 2, or object graph 3) provides a particular view (e.g., a hierarchy or listing of objects) of objects that a particular client may be accessing or utilizing. In an implementation using editing contexts and object graphs, editing contexts 500-504 on clients 508-512 have as their object store 516 a remote editing context 506 on the server 514. When object updates are pushed/transmitted from a client (e.g., clients 508-512) to the server 514, the editing context ensures that the minimal set of changes is sent from each client to the server. When new object data updates are received by an editing context on the client or server, that editing context correctly merges the changes into local objects (that may be located using the object graphs). Editing contexts and object graphs are more fully described in pending U.S. patent application Ser. No. 08/682,198 entitled "Object Graph Editing Context and Methods of Use" which is hereby fully incorporated by reference.

The determination of whether objects should be copied into local address space (also referred to as populating a local graph of objects) may be performed in a variety of manners. One or more embodiments of the invention provide a method for populating a local graph of objects by retrieving remote object data on an as-needed basis in two ways: (1) by explicit request, or (2) by traversing previously unused segments of an object graph.

Figure 6:
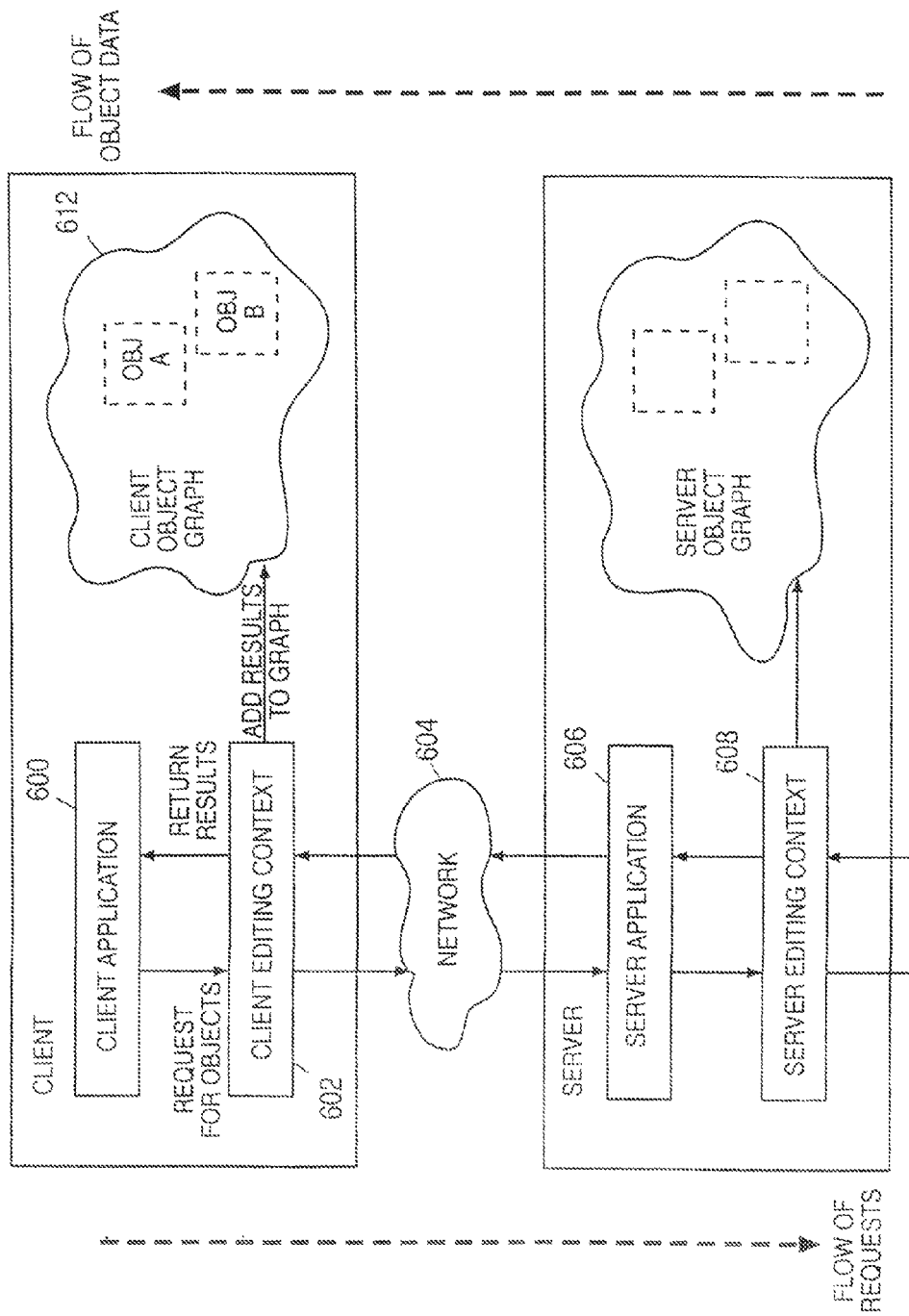
FIG. 6 demonstrates the transmission of objects in accordance with one or more embodiments of the invention.

One of the methods for retrieving remote object data is by explicit request (also referred to as "lazy population"). The developer may need to retrieve copies of all objects of a particular type, or some set of objects which match a specified set of criteria. In one embodiment, a request may be made within business logic or by a user interface for a set of objects managed by an editing context. The request for the objects is transmitted to its object store. Subsequently, the object store transmits the resulting local copies to the object that made the request. FIG. 6 demonstrates the transmission of objects in accordance with one or more such embodiments. Client application 600 transmits the request for objects to client editing context 602. The request is transmitted across a network 604 where it is received by server application 606. Server application 606 transmits the request to server editing context 608. Server editing context 608 transmits the request to object store 610 where the objects are stored. Object store 610 transmits local copies of the objects back through server editing context 608, server application 606, network 604, and client editing context 602 where the local objects may be delivered to client application 600. The results of the request (i.e., the copies of the local objects) may also be reflected in the client object graph 612.

A second method for retrieving objects is by traversing previously 25 unused segments of an object graph (also referred to as "faulting"). Part of an object's data may be references to other objects, and in order to avoid retrieving, the entire remote object graph at once, the editing context at first retrieves only the object data which does not reference other objects. The first time a reference from one object to another is traversed (e.g., an object needs the data or method of another object), the editing context automatically makes a request to its object store for the second object's data, and the second object is populated with the resulting data. In this way only the portion of the object graph traversed by business logic is populated. Thus, an object is only retrieved or populated when it is needed or when a "fault" occurs (i.e., a request for a method or data of an object is issued and the object is not present in local address space (resulting in an error)).

One or more embodiments of the invention provide for an object persistence mechanism (i.e., a mechanism wherein objects may be stored or remain persistent in local or remote address space) that takes advantage of remote object synchronization. Such a system uses an editing context to manage and populate a local object graph as described above. Another editing context in the remote address space propagates requests to its object store, which in turn provides a connection to an external repository such as a relational database or file system. Thus, referring to FIG. 5, local editing contexts 500-504 manage and populate local objects graphs (e.g., object graph 1, object graph 2, and object graph 3). Editing contexts 500-504 transmit requests through a distribution channel (that may include a local object store) across a network to server 514. Server editing context 506 propagates requests to object store 516. Object store 516 provides a connection to an external repository such as relational database 518 or file system 520 where the objects may remain persistent.

Thus, a method and apparatus for distributing and synchronizing objects is described in conjunction with one or more specific embodiments. The invention is defined by the claims and their full scope of equivalents.

The invention claimed is:

1. A method for synchronizing objects, comprising:
in a computer, performing operations for:
copying an object from a remote computer across a network to the computer, the object being a programming unit that includes executable operations and data operated on by the operations, the object being configured to execute operations upon receiving a corresponding type of message; and
synchronizing the operations and data of the object between the computer and the remote computer based on a policy for synchronizing the operations and data of the object between the computer and the remote computer, wherein the policy specifies one or more conditions when the object is to be synchronized, and wherein the policy is based on the object receiving the corresponding type of message.

2. The method of claim 1 wherein said policy is temporally based.

3. The method of claim 1 wherein said policy is based on a type of message.

4. The method of claim 1 wherein said policy is based on a number of messages.

5. The method of claim 1 further comprising a developer configuring said policy.

6. The method of claim 1 wherein said policy provides for synchronizing at least one object when a request is transmitted from said first computer to said second computer.

7. The method of claim 1 wherein said policy is based on user input.

8. A system comprising
a first computer;
an object stored on said first computer, the object being a programming unit that includes executable operations and data operated on by the operations, the object being configured to execute operations upon receiving a corresponding type of message; and
code configured to synchronize the operations and data of the object between the first computer and a second computer based on a policy for synchronizing the operations and data of the object between the first computer and the second computer, wherein the policy specifies one or more conditions when the object is to be synchronized, and wherein the policy is based on the object receiving the corresponding type of message.

9. The system of claim 8 wherein said policy is temporally based.

10. The system of claim 8 wherein said policy is based on a type of message.

11. The system of claim 8 wherein said policy is based on a number of messages.

12. The system of claim 8 wherein said policy may be configured by a developer.

13. The system of claim 8 wherein said policy provides for synchronizing at least one object when a request is transmitted from said first computer to said second computer.

14. The system of claim 8 wherein said policy is based on user input.

15. A computer program product comprising a non-transitory computer-usable storage medium comprising;
a computer usable medium having computer readable program code embodied therein configured to synchronize objects, said computer program product comprising:
computer readable code configured to cause a second computer to obtain a copy of an object from a first computer across a network, the object being a programming unit that includes executable operations and data operated on by the operations, the object being configured to execute operations upon receiving a corresponding type of message; and
computer readable program code configured to cause a computer to synchronize said data and behavior between said first computer and said second computer based on a policy for synchronizing the operations and data of the object between the computer and the remote computer, wherein the policy specifies one or more conditions when the object is to be synchronized, and wherein the policy is based on the object receiving the corresponding type of message.

16. The computer program product of claim 15 wherein said policy is temporally based.

17. The computer program product of claim 15 wherein said policy is based on a type of message.

18. The computer program product of claim 15 wherein said policy is based on a number of messages.

19. The computer program product of claim 15 wherein said policy may be configured by a developer.

20. The computer program product of claim 15 wherein said policy provides for synchronizing at least one object when a request is transmitted from said first computer to said second computer.

* * * * *